(12) United States Patent  
Kaminski, Jr.

(10) Patent No.: US 8,881,884 B2
(45) Date of Patent: Nov. 11, 2014

(54) REBUILDABLE ROLLER AND ROLLER BEARING ASSEMBLY FOR A BELT LINE CONVEYOR SYSTEM AND A METHOD OF USE THEREOF

(71) Applicant: Michael Richard Kaminski, Jr., Ford City, PA (US)

(72) Inventor: Michael Richard Kaminski, Jr., Ford City, PA (US)

( * ) Notice: Subject to any disclaimer, the term of this patent is extended or adjusted under 35 U.S.C. 154(b) by 0 days.

(21) Appl. No.: 13/692,352

(22) Filed: Dec. 3, 2012

(65) Prior Publication Data

US 2013/0140131 A1 Jun. 6, 2013

Related U.S. Application Data

(60) Provisional application No. 61/566,131, filed on Dec. 2, 2011.

(51) Int. Cl.
| | |
|---|---|
| *B65G 13/00* | (2006.01) |
| *B65G 39/09* | (2006.01) |
| *F16C 13/02* | (2006.01) |
| *F16C 35/077* | (2006.01) |
| *B65G 39/02* | (2006.01) |
| *F16C 19/00* | (2006.01) |

(52) U.S. Cl.
CPC ............... *B65G 39/02* (2013.01); *B65G 39/09* (2013.01); *F16C 13/022* (2013.01); *F16C 35/077* (2013.01); *F16C 2326/58* (2013.01); *B65G 13/00* (2013.01); *F16C 19/00* (2013.01); *F16C 2237/00* (2013.01); *F16C 2226/60* (2013.01)
USPC ............... 193/7; 384/418; 384/419; 384/546; 384/587

(58) Field of Classification Search
USPC ....... 193/37; 198/780; 29/428; 384/418, 419, 384/546, 587
See application file for complete search history.

(56) References Cited

U.S. PATENT DOCUMENTS

| | | | | |
|---|---|---|---|---|
| 2,749,133 | A * | 6/1956 | Rich ........................... | 279/2.12 |
| 3,988,045 | A * | 10/1976 | Coutant ...................... | 384/587 |
| 4,034,837 | A * | 7/1977 | Vinarcsik et al. .............. | 193/37 |
| 4,121,694 | A * | 10/1978 | Nelson .............................. | 184/6 |
| 5,375,934 | A * | 12/1994 | Hall et al. ..................... | 384/484 |
| 5,380,104 | A * | 1/1995 | Garnett ........................ | 384/546 |
| 6,209,702 | B1 * | 4/2001 | Agnoff ............................ | 193/37 |
| 6,234,293 | B1 * | 5/2001 | Fasoli ............................. | 193/37 |
| 6,523,678 | B2 * | 2/2003 | Roessler et al. ............. | 198/835 |
| 6,802,410 | B2 * | 10/2004 | Dyson et al. .................... | 193/37 |
| 6,808,063 | B2 * | 10/2004 | Itoh et al. ..................... | 198/788 |
| 6,918,238 | B2 * | 7/2005 | Cooksey et al. ............ | 56/16.4 R |
| 7,581,630 | B2 * | 9/2009 | Hong .............................. | 193/37 |
| 8,075,465 | B2 * | 12/2011 | Verfaellie et al. ............... | 492/21 |
| 8,292,056 | B2 * | 10/2012 | Tsugawa ......................... | 193/37 |
| 8,439,573 | B2 * | 5/2013 | Zuiko ............................ | 384/546 |

* cited by examiner

Primary Examiner — Douglas Hess
(74) Attorney, Agent, or Firm — The Webb Law Firm (57) ABSTRACT

A rebuildable conveyor roller includes a hollow, cylindrical roller tube having a first end opposite a second end. The roller tube has a rebuildable conveyor roller bearing assembly provided at the first end and the second end. The rebuildable conveyor roller bearing assembly is affixed to the roller tube such that at least a part of the rebuildable conveyor roller bearing assembly is removable from the roller tube. A hub of the rebuildable conveyor roller bearing assembly has a generally circular shape that is dimensioned to fit inside the internal diameter of the roller tube. The hub has a centrally located hole through which a stub shaft may be inserted. A bearing holder is inserted in an internal cavity provided within the hub for securing the rebuildable conveyor roller bearing assembly to the roller tube.

20 Claims, 10 Drawing Sheets

REBUILDABLE ROLLER AND ROLLER BEARING ASSEMBLY FOR A BELT LINE CONVEYOR SYSTEM AND A METHOD OF USE THEREOF

CROSS REFERENCE TO RELATED APPLICATION

This application is based on U.S. Provisional Patent Application No. 61/566,131 filed on Dec. 2, 2011, on which priority of this patent application is based and which is hereby incorporated by reference in its entirety.

BACKGROUND OF THE INVENTION

1. Field of the Invention

The present invention relates, in general, to devices and methods relating to a rebuildable conveyor roller. More specifically, the present invention is related to devices and methods for rebuilding or replacing roller bearings provided on terminal ends of a cylindrical conveyor roller.

2. Description of the Related Art

In a belt-type conveyor system, a plurality of rollers is rotatably supported on a stationary frame. Typically, the stationary frame includes a plurality of legs for elevating a main frame portion. The main frame portion generally includes two rails in a parallel arrangement. The plurality of rollers is rotatably supported in a space between the rails. The rollers are generally arranged in a perpendicular orientation with respect to the longitudinal orientation of the rails.

Each roller includes a tubular roller shaft open at the opposing terminal ends. Roller bearings are provided at the opposing terminal ends such that the roller may be rotatably supported when placed in a corresponding receiving slot in the frame rails. Depending on the application, various bearings may be used to rotatably support the roller between the frame rails.

As part of general maintenance of the conveyor system, rollers need to be inspected and replaced once the roller bearings fail or near the end of their service life. Conventional rollers include bearings which are permanently fixed at the terminal ends of the roller. When the bearing fails or needs to be replaced, the entire roller must be discarded. Because a new roller must be used each time a bearing on an existing roller fails or needs to be replaced, the cost of operating and maintaining the conveyor is significantly increased. This becomes particularly evident in applications where the tubular roller shaft is significantly more expensive than the bearings located at its terminal ends.

Accordingly, there is a need in the prior art for a rebuildable conveyor roller in which the bearing provided on the terminal ends of a roller can be serviced or replaced without replacing the entire roller. There is an additional need in the art for a device and method for rebuilding the roller bearing of a conveyor roller that is efficient to manufacture and use.

SUMMARY OF THE INVENTION

In view of the above-described shortcomings within the prior art, a rebuildable roller bearing assembly for rebuilding and replacing the bearings or a conveyor roller without the need to replace the roller itself is provided herein. Further details and advantages of the present invention will be understood from the following detailed description read in conjunction with the accompanying drawings.

Accordingly, and in one preferred and non-limiting embodiment, provided is a rebuildable roller bearing assembly including: a hub adapted to be affixed inside a roller tube, the hub having an internal cavity and a central hole configured to receive a stub shaft; and, an annular bearing holder disposed within the internal cavity of the hub, the bearing holder having a central opening configured to receive a roller bearing. At least a portion of the bearing holder and the roller bearing contained within the bearing holder are removable from the hub.

In certain configurations, the hub further includes a fastener for temporarily securing the bearing holder within the internal cavity of the hub and a fastener hole adapted to receive the fastener. The fastener hole may be threaded and the fastener may be a threaded screw. Optionally, the hub includes two fastener holes spaced 180 degrees apart.

In certain configurations, the bearing holder may also include holes positioned to correspond with the fastener holes of the hub, the bearing holder holes being configured to receive the fastener for affixing the bearing holder to the hub. Optionally, the bearing holder further includes at least one jack bolt hole configured to receive a threaded screw, for lifting at least a portion of the bearing assembly and the bearing attached thereto, from the interior cavity of the hub. The jack bolt hole may be configured to receive a threaded screw which is the same size as the threaded screw of the hub.

In certain configurations, the hub further includes a lip extending around the outer diameter of the hub configured to abut an inner sidewall of the roller tube when the assembly is installed within the roller tube. The assembly may also include a dust cover. The dust cover is configured to be received within the interior cavity of the hub adjacent the bearing holder, the cover comprising a central hole for receiving a stub shaft therethrough, and a fastener for securing the dust cover to the hub.

According to a further aspect of the present invention, a rebuildable roller is provided. The rebuildable roller includes a hollow roller tube having a first open end, a second open end, and a cylindrical sidewall extending therebetween. The roller further includes a roller bearing assembly positioned at a first end and a second end of the roller tube. The roller bearing assembly includes: an annular bearing holder defining a central opening, the bearing holder being disposed within the internal cavity of the hub; an annular roller bearing disposed within the central opening of the bearing holder; and a stub shaft extending through the central hole of the hub and the central opening of the bearing holder for connecting the stub shaft to a stub shaft receptacle of an existing conveyor frame. At least a portion of the roller bearing assembly including the roller bearing is removable from the roller tube.

In certain configurations, the stub shaft includes a cylindrical body, a head located on one end of the body extending radially from the body for seating against a surface of the roller bearing, and an adapter located at an opposite end of the body for connecting the stub shaft within the stub shaft receptacle. The adapter of the stub shaft may include at least one flattened portion. Alternatively, the adapter of the stub shaft may include a hexagonal portion.

In certain configurations, the hub further includes a fastener for temporarily securing the bearing holder within the internal cavity of the hub and a fastener hole adapted to receive the fastener. The bearing holder may also include a hole which corresponds to the fastener hole of the hub and which is also configured to receive the fastener for maintaining the bearing holder within the internal cavity of the hub. The fastener may be a threaded screw.

In certain configurations, the stub shaft further includes a retaining ring disposed within an annular groove extending about the body of the stub shaft and configured to maintain contact with a surface of the bearing holder to retain the bearing holder within the internal cavity.

According to a further aspect of the present invention, a method for assembling a rebuildable conveyor roller is provided. The method includes the steps of: providing a hollow roller tube having at least one open end; providing a hub for each open end, the hub including an internal cavity, a centrally located hole configured to receive a stub shaft, and a fastener hole which receives a fastener for securing a bearing holder to the hub; and affixing the hub to the open end of the tube. The method further includes the steps of: pressing a removable roller bearing within a bearing holder; pressing a stub shaft through an internal opening of the bearing holder; and, affixing the bearing holder including the roller bearing into the interior cavity of the hub with the fastener, such that the bearing holder and bearing are removable from the roller tube.

In certain embodiments of the invented method, the method further includes the step of determining that the roller bearing has failed or is near the end of its service life. Once the user determines that the bearing has failed or is near the end of its service life, the method further includes: removing at least a portion of the bearing assembly including the roller bearing from the roller tube; replacing the roller bearing with a new roller bearing to form a rebuilt bearing assembly; and, installing the rebuilt bearing assembly in the hub.

In certain further embodiments of the invented method, the step of removing at least a portion of the bearing assembly comprises inserting a threaded screw in a jack bolt hole of the bearing holder and rotating the threaded screw to remove the bearing assembly from the hub.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting. As used herein, references to the "present invention" or "invention" relate to exemplary embodiments and not necessarily to every embodiment encompassed by the appended claims.

Referring to the drawings in which like reference characters refer to like parts throughout the several views thereof, a rebuildable conveyor roller bearing assembly is shown. The rebuildable conveyor roller includes a hollow, cylindrical roller tube having a first end opposite a second end. The roller tube has a rebuildable conveyor roller bearing assembly provided at the first end and the second end. The rebuildable conveyor roller bearing assembly is affixed to the roller tube such that at least a part of the rebuildable conveyor roller bearing assembly is removable from the roller tube.

Figures 1, 2:
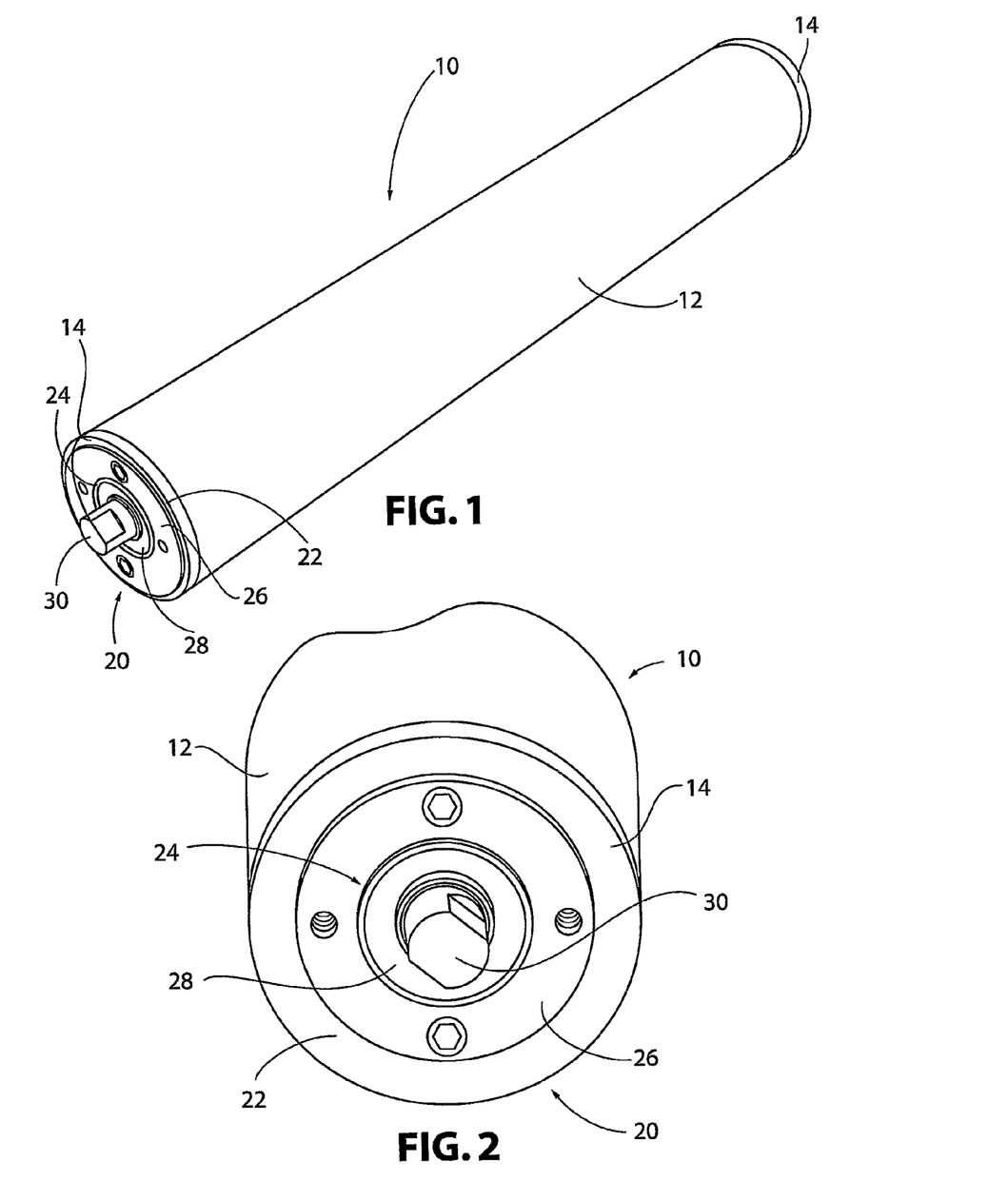
FIG. 1 is a top perspective view of a conveyor roller showing a rebuildable roller bearing assembly installed on the roller.
FIG. 2 is a side view of the conveyor roller shown in FIG. 1, illustrating the rebuildable roller bearing assembly installed on the roller.
Figure 3:
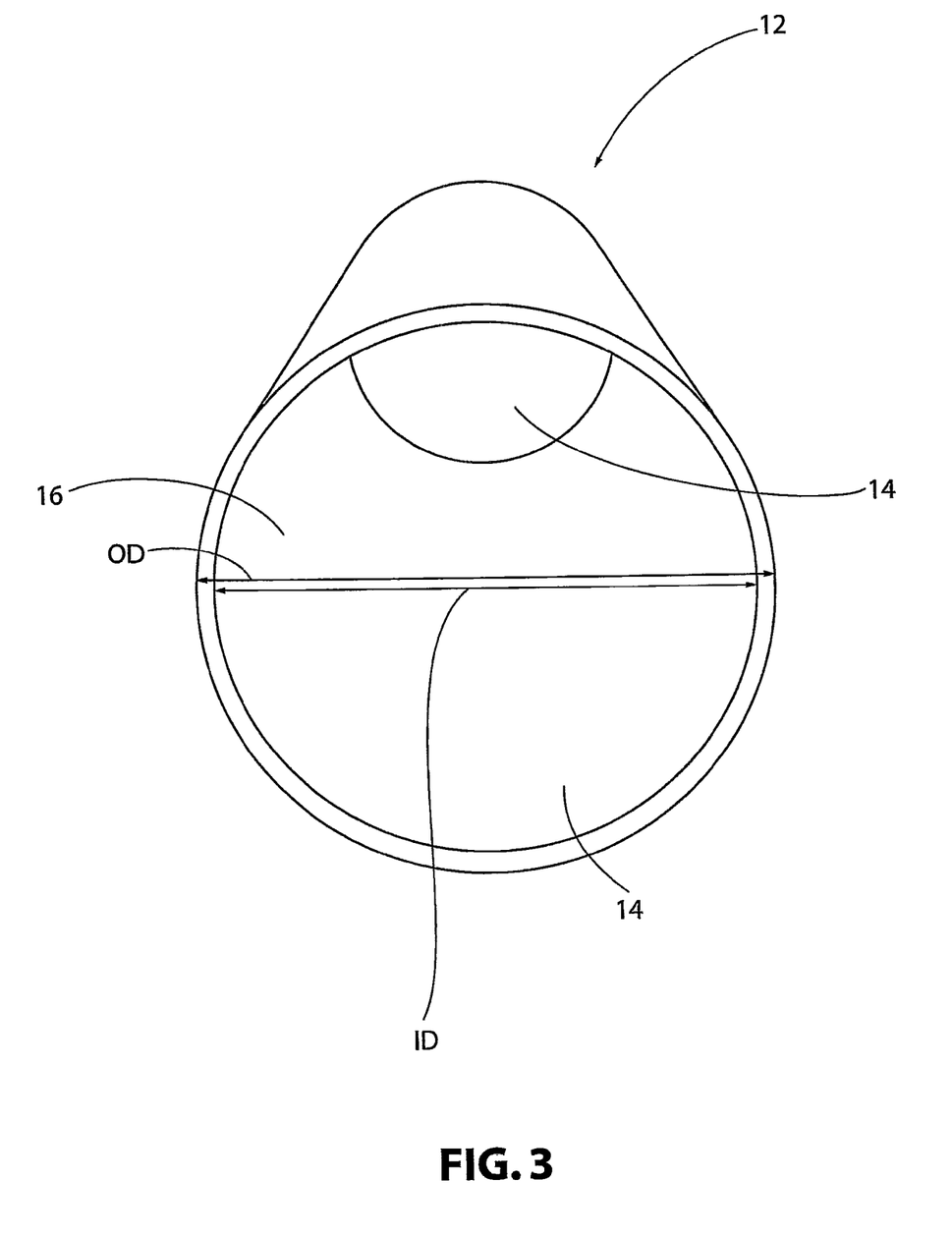
FIG. 3 is a side perspective view of a cylindrical roller tube.

With reference to FIGS. 1 and 2, a rebuildable roller 10 is shown including a rebuildable conveyor roller bearing assembly 20 installed within a conventional roller tube 12. As shown in greater detail in FIG. 3, the roller tube 12 is a hollow tubular structure having circular open opposing ends 14 and a cylindrical sidewall 16 extending therebetween. The sidewall 16 defines an inner diameter ID and outer diameter OD. The outer diameter OD is chosen to correspond with individual customers existing conveyor systems. Commonly used roller tubes have an outer diameter OD of 3½ inches and 6 inches; however, a roller tube of any size may be used within the scope of the invention. The size of the roller tube 12 governs the size of a rebuildable conveyor roller bearing assembly 20 used with the roller tube 12.

Figure 4:
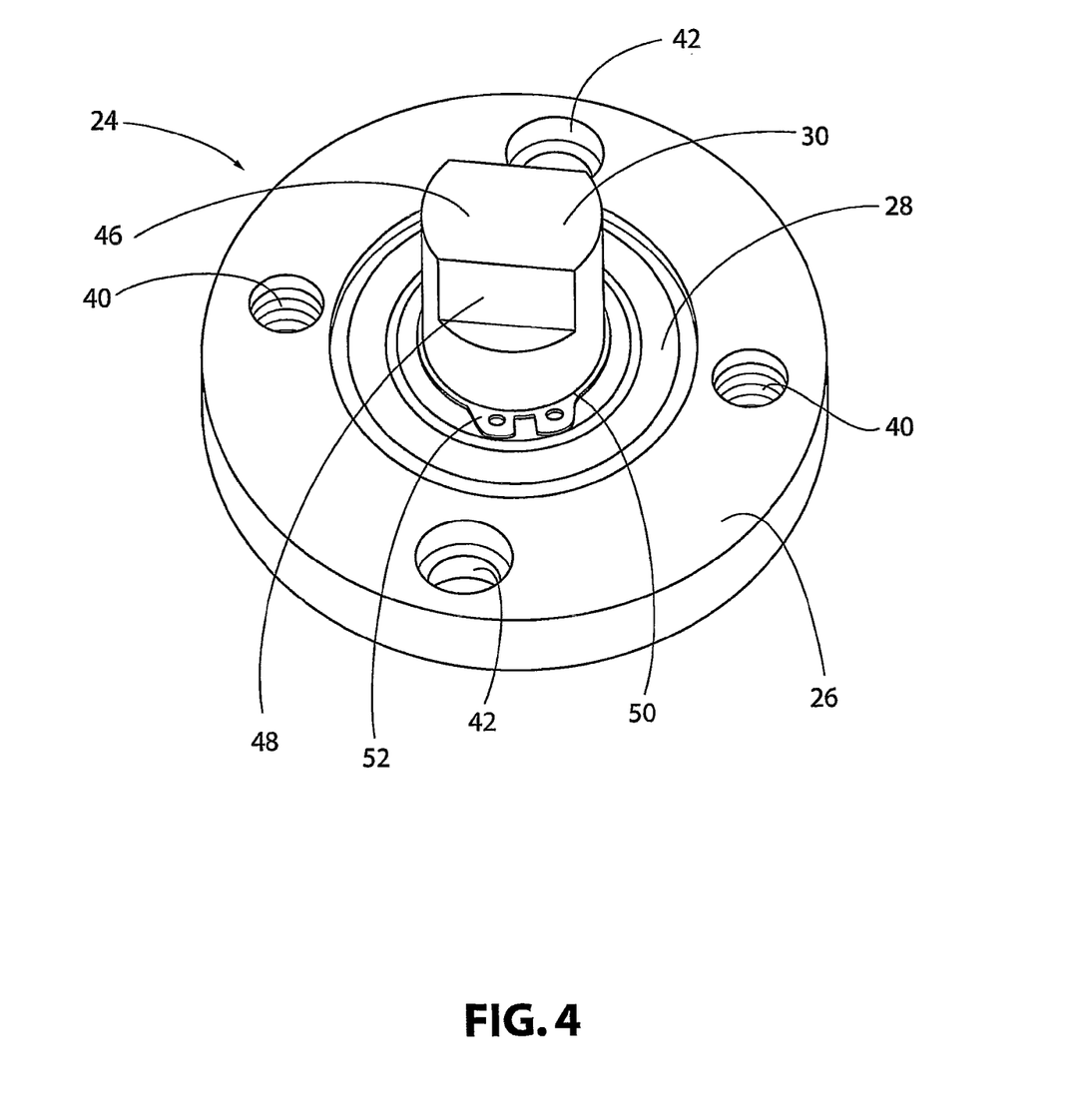
FIG. 4 is a top perspective view of the removable section of a rebuildable roller bearing assembly illustrating a bearing holder, a roller bearing, and a stub shaft assembly.

The rebuildable conveyor roller bearing assembly 20 includes a hub 22 which is permanently welded, or otherwise permanently affixed, in place, at the open end 14 of the tube 12. The rebuildable conveyor roller bearing assembly 20 further includes a removable section 24 having a bearing holder 26, conventional roller bearing 28, and stub shaft 30. With reference to FIG. 4, the removable section 24 of the rebuildable conveyor roller bearing assembly 20 is shown removed from the roller tube 12. The components of the roller bearing assembly 20 are discussed in greater detail below.

Figure 5:
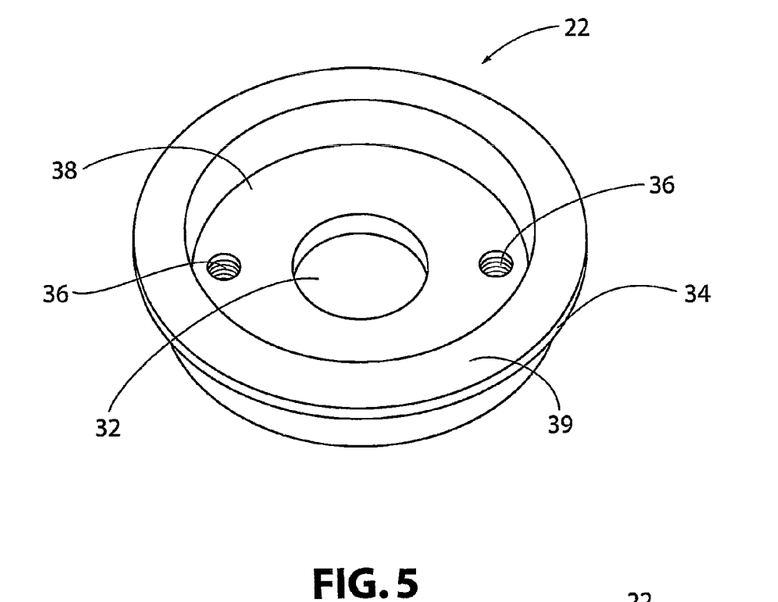
FIG. 5 is a front perspective view of one embodiment of a hub of the rebuildable roller bearing assembly.
Figure 6:
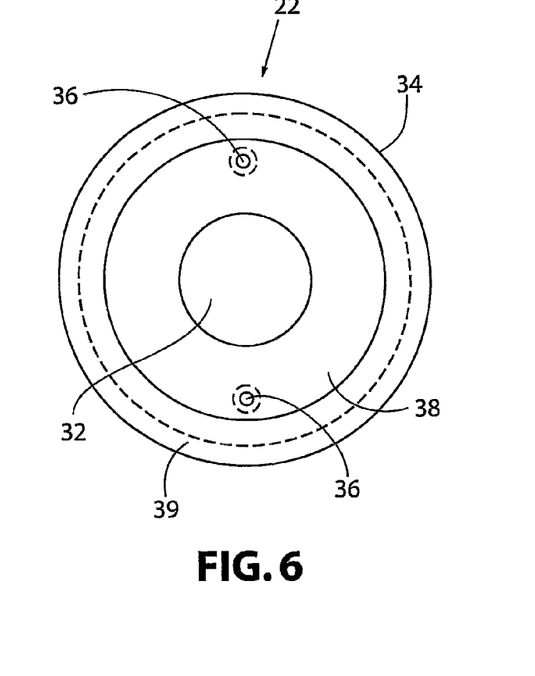
FIG. 6 is a front view of the hub of the rebuildable roller bearing assembly illustrated in FIG. 5.
Figure 7:
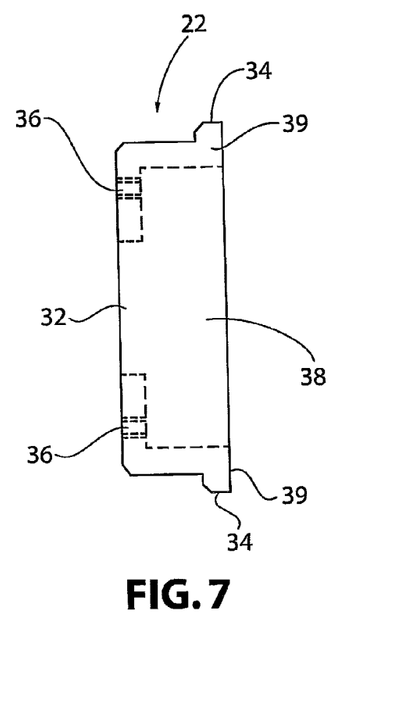
FIG. 7 is a side view of the hub of the rebuildable roller bearing assembly illustrated in FIG. 5.
Figure 8:
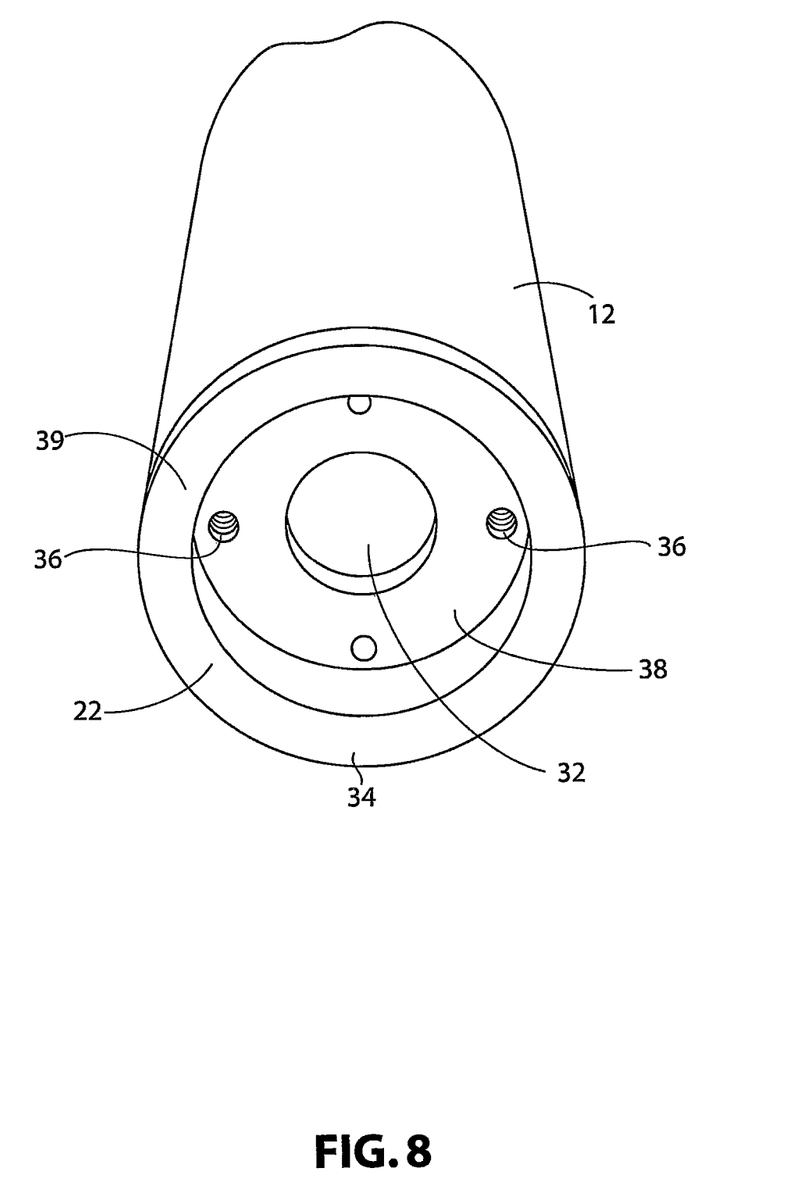
FIG. 8 is a side perspective view of the hub of the rebuildable roller assembly shown installed on a cylindrical roller tube.
Figure 9:
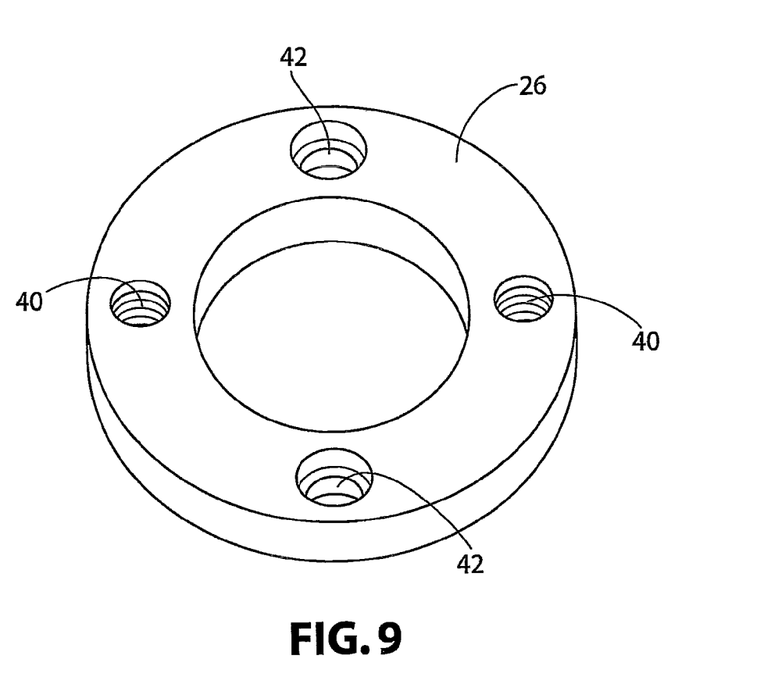
FIG. 9 is a front perspective view of one embodiment of a bearing holder of the rebuildable roller bearing assembly.
Figure 10:
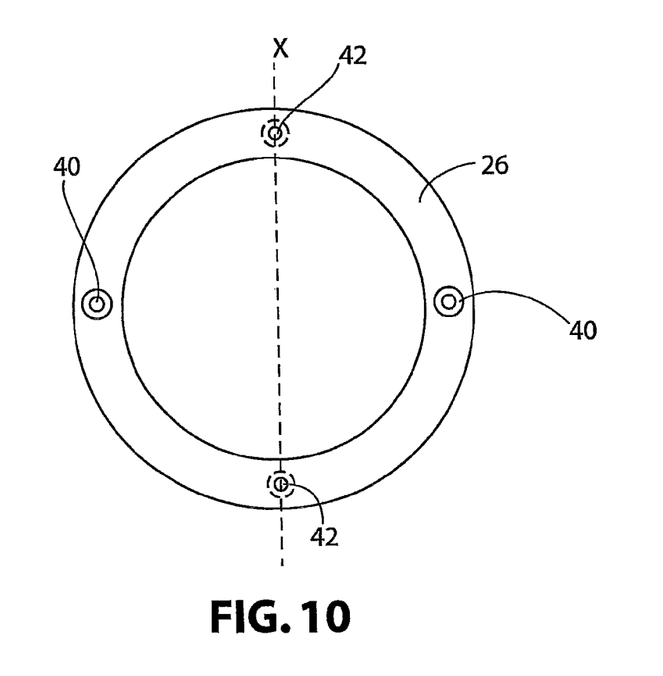
FIG. 10 is a front view of the bearing holder of the rebuildable roller bearing assembly illustrated in FIG. 9.
Figure 11:
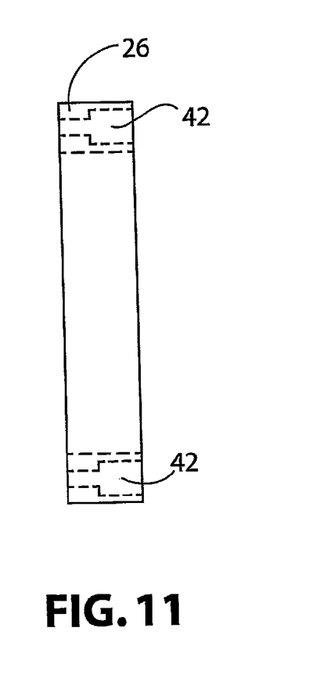
FIG. 11 is a cross sectional view of the bearing holder of the rebuildable roller bearing assembly along line X as illustrated in FIG. 9.
Figure 12:
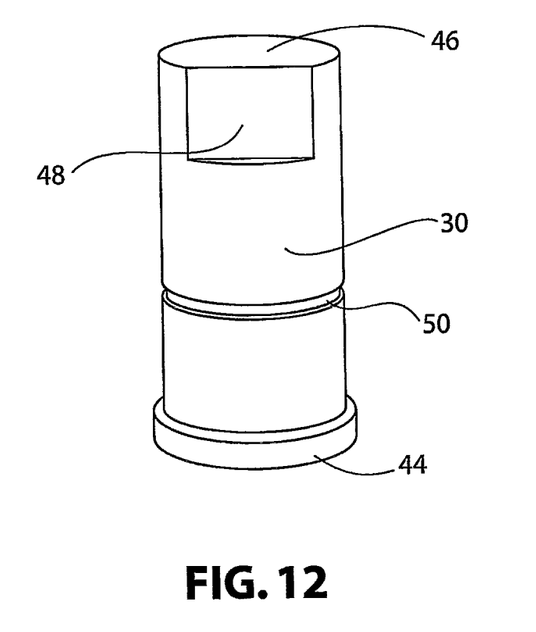
FIG. 12 is a front perspective view of one embodiment of a stub shaft of the rebuildable roller bearing assembly.
Figure 13:
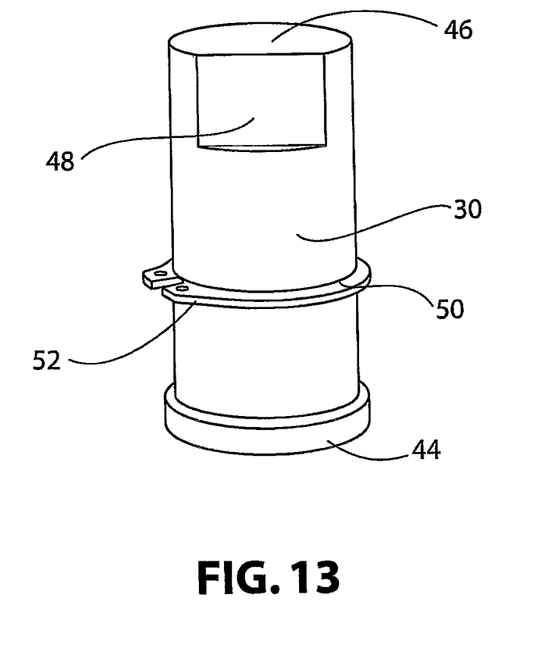
FIG. 13 is a front perspective view of the stub shaft of the rebuildable roller bearing of FIG. 12 with a retaining ring.
Figure 14:
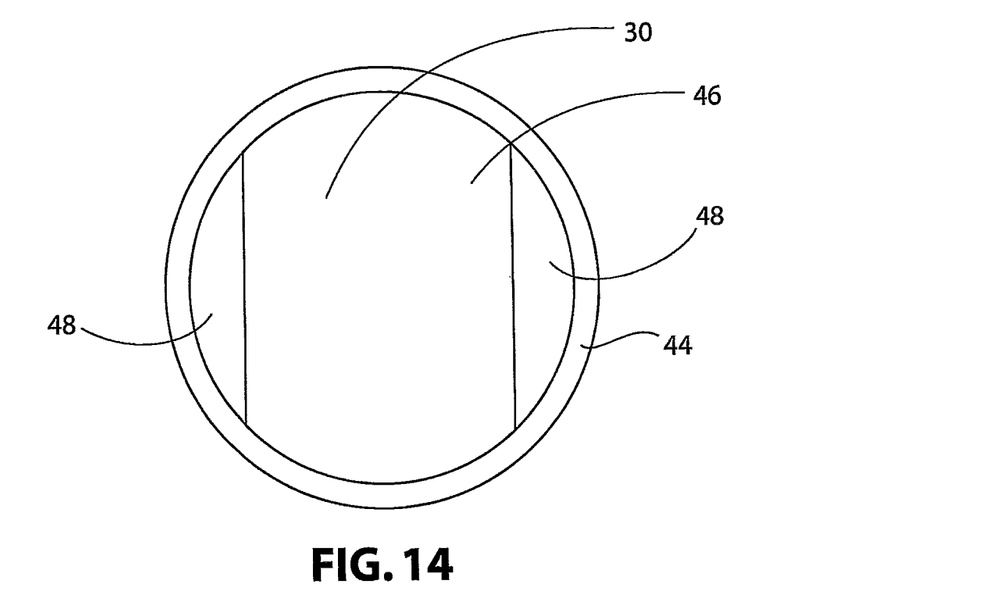
FIG. 14 is a top view of the stub shaft of the rebuildable roller bearing assembly shown in FIG. 12.
Figure 15:
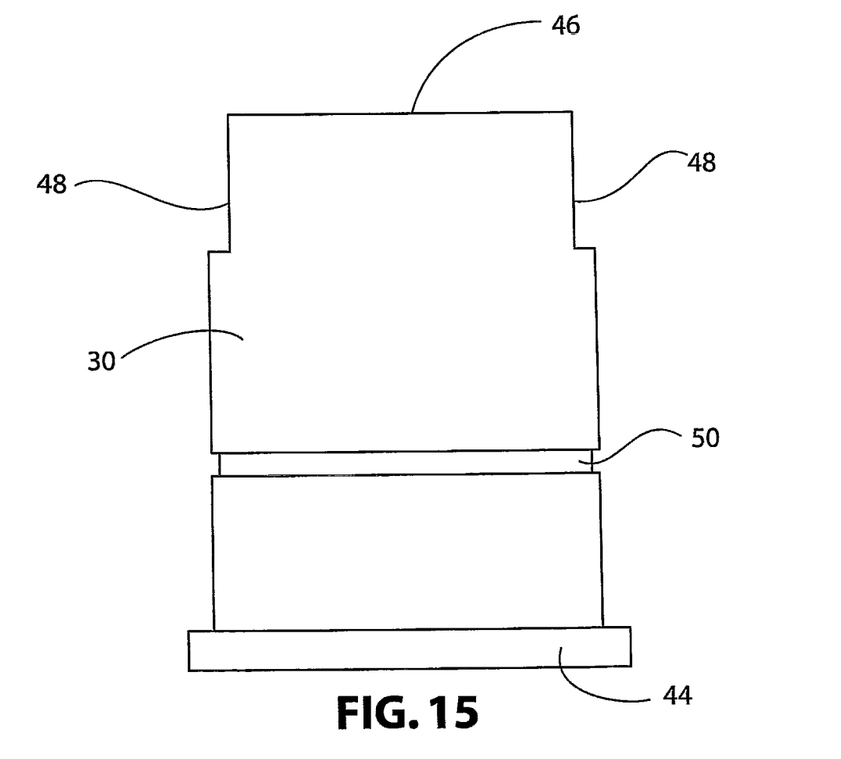
FIG. 15 is a side view of the stub shaft of the rebuildable roller bearing assembly shown in FIG. 12.
Figure 16:
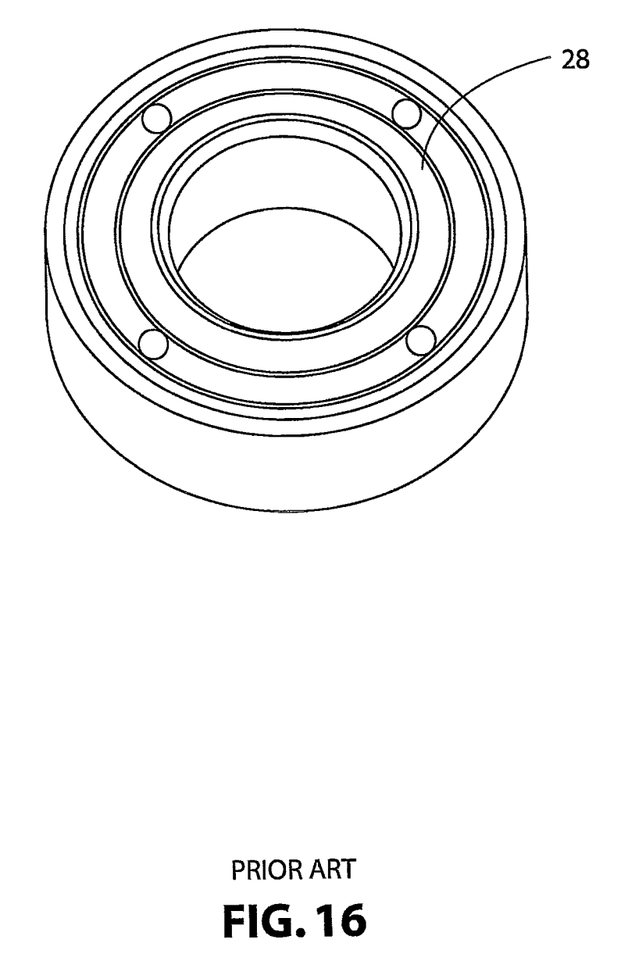
FIG. 16 is a top perspective view of a conventional roller bearing, as is known in the prior art, used with the rebuildable roller bearing assembly.

FIGS. 5-7 illustrate the hub 22 of the rebuildable conveyor roller bearing assembly 20. The hub 22 is formed from steel or other suitable strong material and has a generally circular shape that is dimensioned to fit inside the inner diameter ID of the roller tube 12 such that a portion of the hub 22 abuts the sidewall 16 of the tube 12. The hub 22 includes an annular edge 39 which defines an internal cavity 38 accessible, from one side of the hub 22, through a centrally located hole 32. The stub shaft 30 is inserted through hole 32. An annular lip 34 extending downward from the annular edge 39, abuts the sidewall 16 of the tube 12 when the hub 22 is installed in place. The hub 22 further includes one or more threaded hole 36 that receive a fastener for securing a bearing holder 26 within the internal cavity 38. In one non-limiting embodiment, the fastener is a threaded screw. In a preferred and non-limiting embodiment, the threaded holes 36 are spaced 180 degrees apart from each other, as shown in FIGS. 5-7. In FIG. 8, the hub 22 is shown installed within the roller tube 12.

With reference to FIGS. 9-12, a bearing holder 26 for retaining the bearing 28 within the hub 22 is shown according to one embodiment of the rebuildable conveyor roller bearing assembly 20. The bearing holder 26 has an annular shape defining a central opening. The outer diameter of the bearing holder 26 is dimensioned to fit within the internal cavity 38 provided within the hub 22. The central opening of the bearing holder 26 is dimensioned to accept the conventional bearing 28. A plurality of holes is provided extending between the top and bottom surfaces of the bearing holder 26. More specifically, through holes 40, which correspond to the location of the threaded holes 36 in the hub 22, assist in securing the bearing holder 26 within the internal cavity 38 of the hub 22. The bearing holder 26 also includes jack bolt holes 42, which do not correspond with any holes on the hub 22, and are used for lifting the removable section 24 of the bearing assembly out of the hub 22.

FIGS. 12-15 illustrate one embodiment of the stub shaft 30 of the rebuildable conveyor roller bearing assembly 20. The stub shaft 30 has a generally cylindrical shape with a head 44 provided on one end and an adaptor portion 46 for connecting the stub shaft 30 to an existing conveyor frame at an opposite end. As shown in FIGS. 12-15, in one non-limiting preferred embodiment, the adaptor portion 46 includes flats 48 cut away from the cylindrical stub shaft 30. Alternatively, hexagonal cut away sections or other connections may be used depending on the shape of the existing conveyor frame and as are known in the art. On the other end of the stub shaft 30, the head 44 extends radially outward from the stub shaft 30 for seating the stub shaft 30 against the surface of the bearing 28. The external diameter of the stub shaft 30 is dimensioned such that it can press fit inside a conventional bearing 28 selected for use with the rebuildable conveyor roller bearing assembly 20. The adapter portion 46 of the stub shaft 30 is dimensioned to fit inside the existing conveyor frame.

In one preferred non-limiting embodiment, the stub shaft 30 further includes an annular groove 50 disposed about a mid section of the stub shaft 30. The annular groove 50 is adapted to receive a retaining ring 52. The retaining ring 52 is a generally flat annular ring structure which fits into groove 50 and extends radially there from. As shown, for example, in FIG. 4, when installed in the bearing assembly 20, the retaining ring 52 serves as a safety feature which prevents the shaft 30 from slipping through the central opening of the bearing 28. More specifically, the shaft 30 is held within the central opening of the bearing 28 between the retaining ring 52, on the outward side, and the head 44, on the inward side. In this configuration, the shaft 30 is prevented from slipping in either the inward or outward direction relative to the bearing 28.

Figure 17:
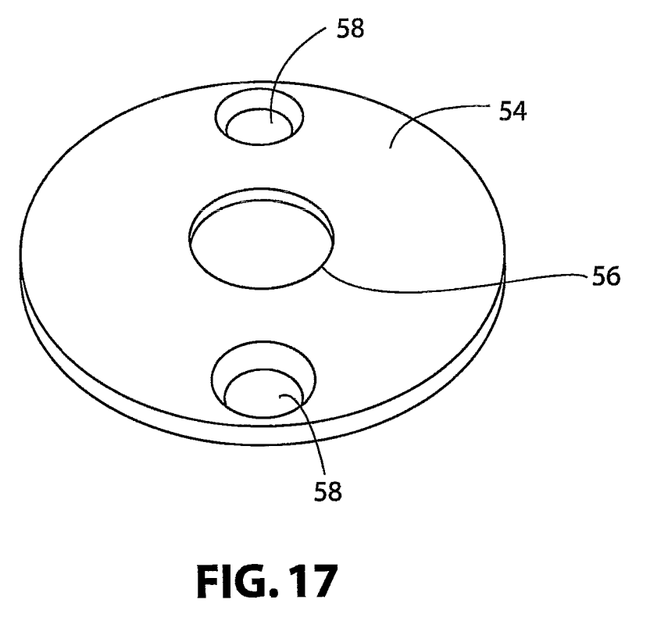
FIG. 17 is a top perspective view of a dust cover for use with a rebuildable roller bearing assembly; and, FIG. 18 is a top perspective view of an embodiment of a rebuildable roller bearing assembly with the dust cover of FIG. 17 installed thereon.
Figure 18:
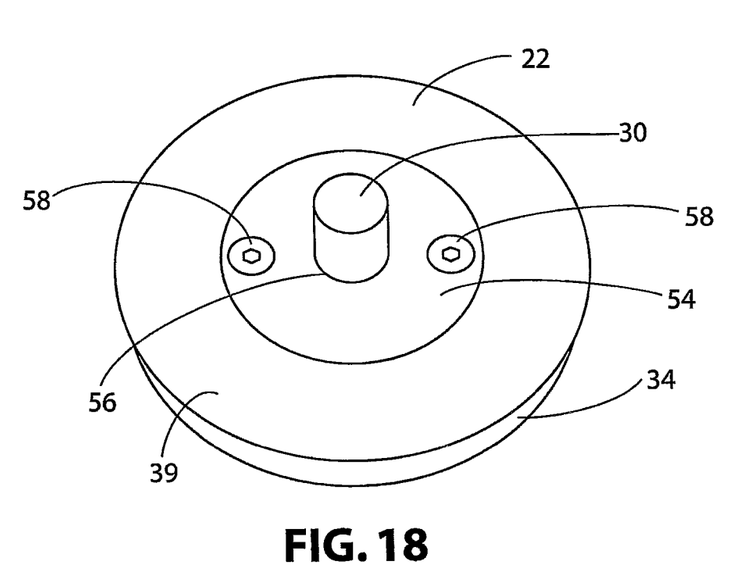

With reference to FIGS. 17 and 18, in a further preferred and non-limiting embodiment, the bearing assembly 20 includes a dust cover 54. The dust cover 54 is a flat annular plate structure including a central hole 56 which corresponds to the central holes of the bearing holder 26 and hub 22. The dust cover 54 may be formed from plastic, metal or any other suitably strong material. The dust cover 54 further includes retaining holes 58 which correspond to the threaded holes 36 of the hub 22 and serve to retain the dust cover 54 to the bearing assembly 20. Threaded screws 60, inserted in the retaining holes 58, retain the dust cover 54 and bearing holder 26 within the internal cavity 38 of the hub 22. Specifically, the dust cover 54 is placed within the internal cavity 38 of the hub 22 adjacent to and above the surfaces of the conventional bearing 28 and bearing holder 26. In FIG. 18, the bearing assembly 20 is depicted with the dust cover 54 attached. As shown in FIG. 18, the dust cover 54 is positioned such that the surface of the dust cover 54 is substantially flush with the annular edge 39 of the hub 22.

Having described the components of the rebuildable conveyor roller 10 and bearing assembly 20 and how they interrelate with a roller tube 12, a method of assembling the rebuildable conveyor roller bearing assembly 20 on the roller tube 12 and a method for replacing the bearing 28 will now be described. A hub 22 is welded, or otherwise permanently affixed, at each open end 14 of the roller tube 12. At the next step, a roller bearing 28 is pressed inside the bearing holder 26 by pressing the outer diameter OD of the roller bearing 28 within the central opening of the bearing holder 26. Next, a stub shaft 30 is pressed into the internal opening of the roller bearing 28 by pressing the body of the stub shaft 30 through the central hole of the bearing 28. The next step includes affixing the removable portion 24 of the bearing holder assembly 20 into the hub 22. This can be accomplished by fastening the removable portion 24 to the hub 22 by securing threaded screws 60 inside the threaded hole 36 on the hub 22. The completed roller 10 can then be installed on an existing conveyor system.

The following describes the steps for removing and replacing a roller bearing 28 from a roller 10. To remove the removable portion 24 of the roller bearing assembly 20 from the hub 22, the threaded screws 60 holding the bearing assembly 20 are removed and inserted into the jack bolt holes 42 on the bearing holder 26. By turning the threaded screws 60 consecutively in small increments, the screws 60 will eventually pass through the bearing holder 26 and contact (i.e. bottom out against) the hub 22. Further advancement of the screws 60 will press the bearing assembly 20 out of the hub 22, thereby removing the bearing assembly 26 from the hub 22. Once the bearing assembly 26 is removed from the hub 22, the worn bearing 28 can be pressed out of the bearing holder 26 using an hydraulic press and replaced with a new bearing 28. Then, the rebuilt removeable portion 24 of the bearing assembly 20 can be installed in the hub 22 in a manner described above.

The present rebuildable conveyor roller bearing assembly 20 offers a cost effective solution for replacing the bearings 28 in rollers of a conventional conveyor system. The bearings 28 may be removed and replaced without the need to completely replace the roller. In typical applications, the roller tube outlasts the bearings, so that multiple bearing changes may be made during the life of the roller. The replacement of the bearing can be performed at a fraction of the cost of replacing the entire roller.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A roller bearing assembly comprising:
   a hub adapted to be affixed inside a roller tube, the hub having an internal cavity and a central hole configured to receive a stub shaft; and,
   an annular bearing holder disposed within the internal cavity of the hub, the bearing holder having a central opening configured to receive a roller bearing,
   wherein at least a portion of the bearing holder and the roller bearing contained within the bearing holder are removable from the hub.

2. The roller bearing assembly of claim 1, wherein the hub further comprises a fastener for temporarily securing the bearing holder within the internal cavity of the hub and a fastener hole adapted to receive the fastener.

3. The roller bearing assembly of claim 2, wherein the fastener hole is threaded and wherein the fastener is a threaded screw.

4. The roller bearing assembly of claim 3, wherein the hub comprises two fastener holes spaced 180 degrees apart.

5. The roller bearing assembly of claim 3, wherein the bearing holder comprises holes positioned to correspond with the fastener holes of the hub, the bearing holder holes being configured to receive the fastener for affixing the bearing holder to the hub.

6. The roller bearing assembly of claim 3, wherein the bearing holder further comprises at least one jack bolt hole configured to receive a threaded screw, for lifting at least a portion of the bearing assembly and the bearing attached thereto, from the interior cavity of the hub.

7. The roller bearing assembly of claim 6, wherein the jack bolt hole is configured to receive a threaded screw, the threaded screw being the same size as the threaded screw of the hub.

8. The roller bearing assembly of claim 1, wherein the hub further comprises a lip extending around the outer diameter of the hub configured to abut an inner sidewall of the roller tube when the assembly is installed within the roller tube.

9. The removable roller bearing assembly of claim 1, further comprising a dust cover configured to be received within the interior cavity of the hub adjacent the bearing holder, the cover comprising a central hole for receiving a stub shaft therethrough, and a fastener for securing the dust cover to the hub.

10. A rebuildable conveyor roller, comprising:
    a hollow roller tube having a first open end, a second open end, and a cylindrical sidewall extending therebetween; and,
    a roller bearing assembly positioned at a first end and a second end of the roller tube, the assembly comprising:
    a hub having an internal cavity accessible through a central hole; an annular bearing holder defining a central opening, the bearing holder being disposed within the internal cavity of the hub, an annular roller bearing disposed within the central opening of the bearing holder, and a stub shaft extending through the central hole of the hub and the central opening of the bearing holder for connecting the stub shaft to a stub shaft receptacle of an existing conveyor frame,
    wherein at least a portion of the roller bearing assembly including the roller bearing is removable from the roller tube.

11. The roller of claim 10, wherein the stub shaft comprises a cylindrical body, a head located on one end of the body extending radially from the body for seating against a surface of the roller bearing, and an adapter located at an opposite end of the body for connecting the stub shaft within the stub shaft receptacle.

12. The roller of claim 11, wherein the adapter of the stub shaft comprises at least one flattened portion.

13. The roller of claim 11, wherein the adapter of the stub shaft comprises a hexagonal portion.

14. The roller of claim 10, wherein the hub further comprises a fastener for temporarily securing the bearing holder within the internal cavity of the hub and a fastener hole adapted to receive the fastener.

15. The roller of claim 14, wherein the bearing holder further comprises a hole which corresponds to the fastener hole of the hub and which is also configured to receive the fastener for maintaining the bearing holder within the internal cavity of the hub.

16. The roller of claim 15, wherein the fastener is a threaded screw.

17. The roller of claim 10, further comprising a retaining ring disposed within an annular groove extending about the body of the stub shaft and configured to maintain contact with a surface of the bearing holder to retain the bearing holder within the internal cavity.

18. A method of assembling a rebuildable conveyor roller comprising:
    providing a hollow roller tube having at least one open end;
    providing a hub for each open end, the hub comprising an internal cavity, a centrally located hole configured to receive a stub shaft, and a fastener hole which receives a fastener for securing a bearing holder to the hub;
    affixing the hub to the open end of the tube;
    pressing a removable roller bearing within a bearing holder;
    pressing a stub shaft through an internal opening of the bearing holder; and,
    affixing the bearing holder including the roller bearing into the interior cavity of the hub with the fastener, such that the bearing holder and bearing are removable from the roller tube.

19. The method of claim 18, further comprising the steps of:
    determining that the roller bearing has failed or is near the end of its service life;
    removing at least a portion of the bearing assembly including the roller bearing from the roller tube;
    replacing the roller bearing with a new roller bearing to form a rebuilt bearing assembly; and,
    installing the rebuilt hearing assembly in the hub.

20. The method of claim 19, wherein the step of removing at least a portion of the bearing assembly comprises inserting a threaded screw in a jack bolt hole of the bearing holder and rotating the threaded screw to remove the bearing assembly from the hub.

* * * * *

UNITED STATES PATENT AND TRADEMARK OFFICE
CERTIFICATE OF CORRECTION

PATENT NO.         : 8,881,884 B2
APPLICATION NO.    : 13/692352
DATED              : November 11, 2014
INVENTOR(S)        : Michael Richard Kaminski, Jr.

It is certified that error appears in the above-identified patent and that said Letters Patent is hereby corrected as shown below:

In the Claims

Column 7, Line 53, Claim 9, before "roller" delete "removable"

Column 8, Line 61, Claim 19, delete "hearing" and insert -- bearing --

Signed and Sealed this
Twenty-eighth Day of April, 2015

Michelle K. Lee
*Director of the United States Patent and Trademark Office*